Reissued Mar. 20, 1928. Re. 16,914

UNITED STATES PATENT OFFICE.

WALTER E. TRENT, OF NEW YORK, N. Y., ASSIGNOR TO TRENT PROCESS CORPORATION, OF NEW YORK, N. Y., A CORPORATION OF DELAWARE.

PROCESS FOR PREVENTING MINE EXPLOSIONS.

No Drawing. Original No. 1,642,912, dated September 20, 1927, Serial No. 744,847, filed October 20, 1924. Application for reissue filed December 14, 1927. Serial No. 240,069.

The invention relates to improvements in a method for preventing dust explosion in coal mines.

In the operation of mines at the present time it is the practice to distribute inert dust such as powdered limestone, shale, silica, soil, or the like, on the roof ribs and floors of coal mine workings and all places wherever practicable that may offer lodgment for floating coal dust.

This causes dilution of the settled coal dust and retards the exothermic reaction that concentrated coal dust sets up by oxygen entrainment in the dust and adjacent thereto and by thus retarding the initial heat reactions the coal is less liable to heat up to kindling and explosive temperature.

It is impossible to get a uniform distribution of the dust over the surfaces of the roof, ribs and floor, in the ordinary dusting operation as about two thirds of the dust will get to the floor and one third over the other surfaces and this ratio should be reversed.

An effort to get a more uniform distribution has lead to a practice of spreading adobe mud over these surfaces, but mud, both in its wet condition and after drying and caking, will not permit the coal dust properly to mix with the same to get the desired dilution.

In the case of neither dust nor mud is the physical character of a coal dust particle changed so as to make it inert or proof against exothermic reaction at ordinary mine working temperatures.

It is an object of the invention to prevent coal dust explosions in mines by coating coal particles with a skin or covering of a high flash point viscous oil that will permanently prevent the particles from setting up low temperature oxidation and then further to safe guard the particles from combustion conditions by imbedding them in a bed or surface of the heavy combustion resistant oil.

In my Patent Number 1,479,657 I have disclosed a process by means of which fine coal is prevented from exploding and also from "dusting". I disclose in this patent a process in which a small percentage of high boiling point oil is mixed with coal dust in an amount sufficient to put a thin film or coat around each particle. This oil coating produces two effects, first it completely prevents the coal particle from generating heat by slow low temperature oxidation or combustion and it prevents the coal particles from "dusting", that is, it causes it to stay settled under ordinary conditions.

In my Patent No. 1,420,165 I disclose the marked affinity between oil and coal dust and their characteristics to form a true amalgam. Both the filming of the coal particles with oil then embedding or amalgamating these particles in a layer of oil are factors in preventing coal dust explosions.

The invention primarily consists in applying to exposed wall surfaces of a mine, or to any surface that offers lodgment or collecting places for dust, a high boiling point oil which is high in flash point and serves to lodge or entrap particles of coal dust.

It is contemplated to direct the travel of circulating air that has, or may have at times, suspended coal particles so as to give contact with the oil covered surfaces to hasten and localize the collection of the dust so far as it may prove practicable in mines.

In addition to "dusting" and "mudizing" there has been put into practice a most highly effective system described as "dust barriers". This practice consists in the principle of placing comparatively large amounts of inert dust at strategic points in mines, the containers being delicately positioned so that at any slight atmospheric disturbance the containers will spill the dust and permit same to become diffused in the air or gases and thus cause the retardation or suffocation of flame propagation of an explosion at its incipiency.

This system may be called a "second line of defense" and I wish to acknowledge its novelty and its great usefulness and further to say that the present method described does not lend itself to this particular practice to prevent or retard an explosion already inaugurated and that it is a system that should be used with the present disclosure for a second line of defense as now used.

Referring now more specifically to my invention I preferably coat the walls and surfaces of a mine with a hydrocarbon oil having a very high flash point with sufficient viscosity to remain on a surface after having been placed thereon. I may use the residual oil from an oil cracking process, I can use also certain "topped" oils from which has been removed the gasoline and intermediate boiling point fractions. This oil is applied by spraying, painting, or otherwise, in such places as coal particles are to be found.

The particles of coal suspended in the air contact with the hydrocarbon oil and because of the existing affinity between coal and oil are immediately collected and entrapped and made immune to exothermic reaction below the ordinary combustion temperatures. The oil will absorb or collect more than its own weight of coal dust before becoming saturated and inactive and at such times additional oil may be added to the amalgam surface to restore its activeness.

At places where dust is collected in rather large quantities it will be necessary to remove the amalgam by scraping or otherwise and then applying the new surfaces of oil.

I may place ventilating fans in the mines to direct the air currents carrying the coal dust so as to contact with the oiled surfaces or I may direct those currents by any other means. The oil to be used is preferably one that contains only fractions that boil at about 300° centigrade and upwards. The ordinary fuel oils of about 12 or 14° Baumé gravity from which have been removed all fractions that boil up to 300° centigrade are very suitable. Heavy transformer oils are likewise suitable and also oils that have the flash point specifications of lubricating oils. Greases of many kinds answer the purpose and cheap oil water emulsions such as base sediment are fit for the purpose.

If it is desired to use a thin oil that has the other necessary characteristics it becomes suitable by thickening the same with dry shale or rock dust so that it will remain on the surface after being applied. In fact any semiliquid material that does not harden and that will absorb and hold coal dust and has the desired adhesive characteristics of the oil may be utilized in accordance with this invention.

I claim:

1. A process for preventing mine explosions consisting in applying a hydrocarbon oil having a high boiling point and a high flash point to a mine surface to entrap and retain finely divided coal particles contacting therewith to render said particles substantially incapable of an exothermic reaction.

2. A process for preventing mine explosions which consists in applying a hydrocarbon oil having a high boiling point to a mine surface to entrap coal particles and to separate them so as to prevent an exothermic reaction from occurring between said particles.

3. A process of collecting coal dust carried in air suspension in a mine to render the same immune to low temperature reaction with oxygen, consisting in applying to the surface of the mine a high boiling point oil and in bringing the dust particles in contact with said oil surface to coat and agglomerate said dust particles.

4. A process for preventing mine explosions consisting in applying a liquid oil having a high boiling point to a mine surface and in projecting fine coal particles against said oil coating to enable the oil to entrap the coal particles and to so separate them as to prevent an exothermic reaction from occurring between said particles.

WALTER E. TRENT.